United States Patent
Birmiwal et al.

(10) Patent No.: US 7,668,094 B2
(45) Date of Patent: Feb. 23, 2010

(54) TIME-OFFSET REGULATED METHOD AND SYSTEM FOR SYNCHRONIZATION AND RATE CONTROL OF MEDIA DATA

(75) Inventors: Shishir Birmiwal, Bangalore (IN); Bhavani Gopalakrishna Rao, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 185 days.

(21) Appl. No.: 11/834,010

(22) Filed: Aug. 6, 2007

(65) Prior Publication Data

US 2009/0041053 A1    Feb. 12, 2009

(51) Int. Cl.
*H04L 12/00* (2006.01)
(52) U.S. Cl. .................. 370/231; 370/229; 370/230; 709/230; 709/231; 709/232; 709/233; 709/234
(58) Field of Classification Search ......... 709/230–234; 370/229–231
See application file for complete search history.

(56) References Cited

U.S. PATENT DOCUMENTS

| 5,793,747 | A * | 8/1998 | Kline .................... 370/230 |
| 6,754,715 | B1 * | 6/2004 | Cannon et al. ............. 709/231 |
| 7,020,722 | B2 * | 3/2006 | Sivier et al. .............. 709/248 |
| 2003/0128294 | A1 * | 7/2003 | Lundblad et al. ........... 348/515 |
| 2004/0001591 | A1 * | 1/2004 | Mani et al. ................ 380/210 |
| 2004/0170162 | A1 * | 9/2004 | Hung ...................... 370/389 |

* cited by examiner

*Primary Examiner*—William Trost, IV
*Assistant Examiner*—Ashil Farahmand
(74) *Attorney, Agent, or Firm*—Prakash Nama; Global IP Services, PLLC

(57) ABSTRACT

A method and device for synchronization and rate control of media data comprising adaptively computing an offset time using the reference time of a server, a local time of a client, and an associated time for presentation of the data, stamping the offset time on the media data, receiving the offset time stamped media data into a first buffer, processing the offset time stamped media data, computing an altered offset time, including the altered offset time with the processed media data, storing the processed media data in a second buffer, and selectively supplying the processed media data to a presentation sink unit according to the altered offset time, the server reference time, and the associated time of the media data.

18 Claims, 6 Drawing Sheets

TIME-OFFSET REGULATED METHOD AND SYSTEM FOR SYNCHRONIZATION AND RATE CONTROL OF MEDIA DATA

FIELD OF THE SUBJECT MATTER

The present subject matter relates to methods and systems for managing media data. More particularly, the subject matter relates to time-offset regulated method and system for synchronization and rate control of media data.

BACKGROUND

A typical media processing unit may include a server and a client. The server receives data from any standard multimedia source (e.g. camera, microphone) and transforms the data into a media data. The media data may be either stored on a media storage device or may be communicated over a network to another server or client. On the other hand, the client may receive the media data from a media storage device or from a network and convert it into a form that can be presented on a user interface.

The server may receive data from the multimedia source in analog form. The server may include an Analog to Digital Converter (ADC) where the data may be converted into a digital form. The digital data is then sent to a compression unit, which may compress the digital data. The compression unit may compress the digital data according to the type of the digital data. For example, if the digital data is an audio data then the compression may be performed according to an audio compression technique. On the other hand, if the digital data includes video data then the compression may be performed according to a video compression technique. The compressed digital data is then supplied to a packet converter. The packet converter converts the compressed digital data into packets of media data. The packets of media data may include timestamps and other details such as, encoding technique, synchronizing bit (preambles etc) that relate to the digital data. At a further block, if the media data includes both audio and video contents then the media data may be multiplexed or synchronized so that audio and video data may be presented synchronously. The multiplexed/synchronized media data may be then supplied to a network or a media storage device.

The client, on the other hand, may perform the steps performed by the server in the reverse order. The client may receive (packets of) media data from a network or a media storage device. It may identify packets of media data according type of information content (audio or video) thereof. It may further synchronize according to the timestamp of the media data and uncompress the media data. The client may convert the media data into analog form and provide the analog form of the media data to a presentation unit according to the timestamp of the corresponding media data.

Generally, the clients are provided with buffers to interface the network/media storage device from which the media data is required to be received by the client. The buffers may be provided with the client because typically the networks/media storage devices provide the media data at substantially constant bit rate, however, the client may not require the media data at the constant bit rate.

A typical client does not start processing media data until the media data is sufficiently buffered. Further, the client and the server may have a clock offset; accordingly the client first receives a reference time from the server and adjusts its local time according to the reference time before processing the media data. Whenever, there is a change in the reference time of the server, the local time of the client is adjusted accordingly.

One of the problems of this mechanism surfaces during a "seek" operation, where media data is required to be accessed from random locations. As a result, the local time and the reference time may be required to be adjusted. The media data buffered in the system till this time, as a result, loses its time reference. Special handling is required for this scenario and typically, the buffered media-data is dropped or flushed out of the buffers. Similar problems arise due to lost or change in the reference time during fast-forward, fast-rewind and other non-regular-play (also known as trick-play) operations.

BRIEF DESCRIPTION OF DRAWINGS

Embodiments of the invention will now be described, by way of example only, with reference to the accompanying drawings in which.

DETAIL DESCRIPTION OF DRAWINGS

In the following detailed description of various embodiments of the invention, reference is made to the accompanying drawings that form a part hereof, and in which are shown by way of illustration for specific embodiments in which the invention may be practiced. These embodiments are described in sufficient detail to enable those skilled in the art to practice the invention and it is to be understood that other embodiments may be utilized and that changes may be made without departing from the scope of the present invention. The following detailed description is, therefore, not to be taken in a limiting sense and the scope of the present invention is defined only by the appended claims. Further in the discussion hereinafter, a method according to present subject matter is being generally described by way of explaining a series of steps. However, it should be noted that for the purpose of implementing the present subject matter, it may not be necessary to perform the steps of the method in the sequential order as explained herein.

Figure 1:
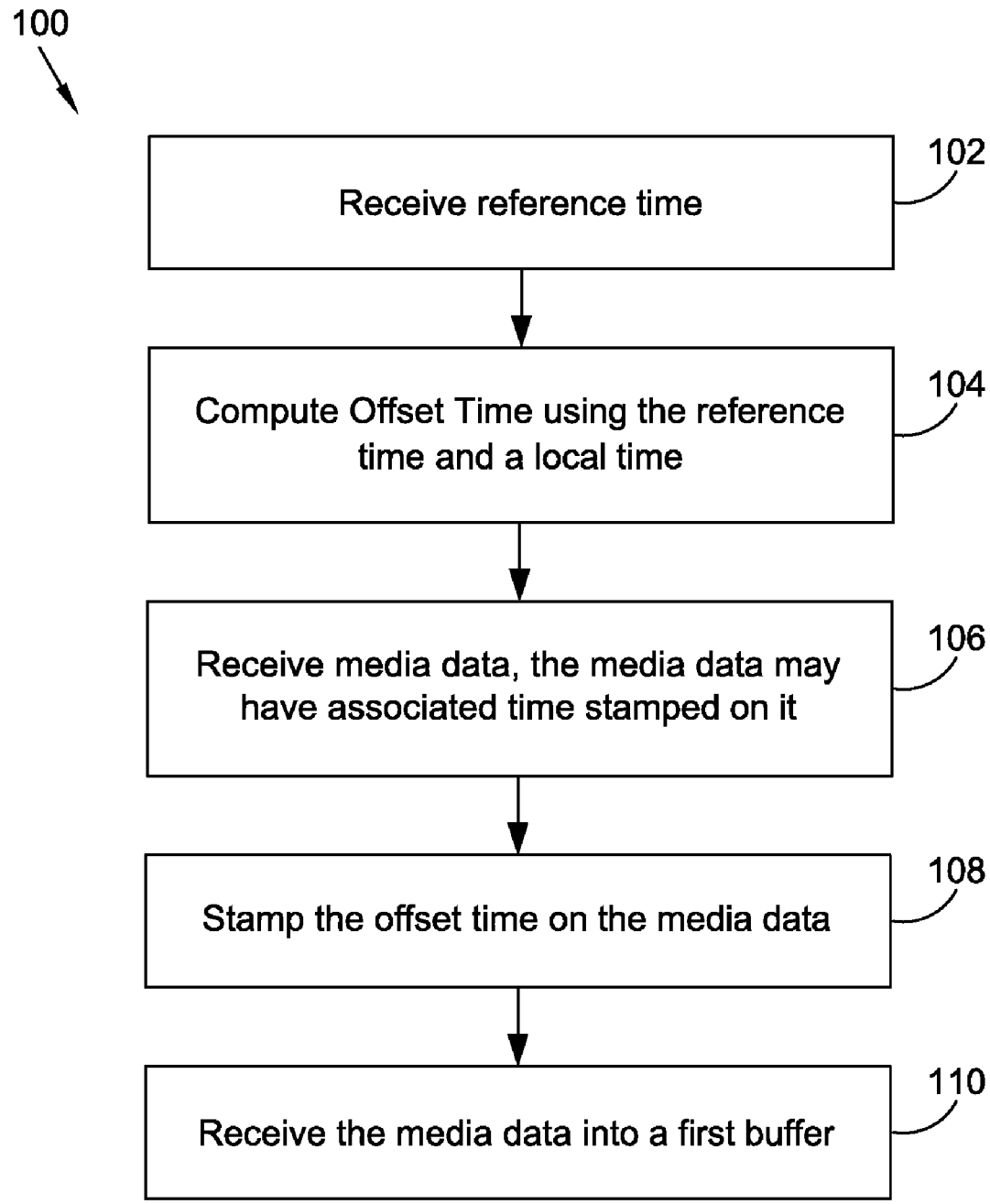
FIG. 1 shows a method in accordance with an embodiment of the present subject matter.

FIG. 1 shows a method 100 in accordance with an embodiment of the present subject matter. The method 100 includes a step 102 where a reference time is received. At step 104, an offset time may be computed using the reference time and a local time. At step 106, a media data may be received. At step 108, the offset time is stamped for including the offset time with the media data. The step 108 of stamping the offset time for including the offset time with the media data may involve a step of reserving a flag and/or an offset variable in the media data. The stamping process may copy the offset value into the offset variable and/or may also set the flag. At a step 110, the offset time stamped media data may be received into a first buffer. The buffered media data may be made available for processing substantially immediately.

It should be noted that, the reference time and the media data may be received substantially simultaneously. Further it should be noted that when the method 100 is being executed to receive the reference time and the media data from a network or a media storage device or any other source, then the reference time may be received either in a parsed manner bundled with the media data or it may also be received separately. The media data may be received as packets of media data. Each of the packets of media data may either include a reference time or may refer to a reference time. Alternatively, a first and a second reference time may be received corresponding to a first packet and a second packet of media data and a reference time for each of the packets of media data present in between the first and the second packets of media data (say, intermediate media data) may be interpolated according to the size of the packets of the media data. According to one embodiment, the average size of the packets of media data may be determined and for each of the intermediate packets of media data a reference time may be determined according to its size. According to another embodiment, the reference time of each of the intermediate packets of media data may be determined by evenly distributing a time interval amongst each of the intermediate packets of media data.

Further the media data may also include an associated time stamp. The associated time stamp may indicate an associated time for presentation of the media data with respect to the reference time of the media data or any other time when the data may be required to be processed, communicated, stored and/or required to be ready for any operation. The associated time may be relative to the reference time or any other time frame that is associated with the reference time. The association of the time frame and the reference time may be an association according to an operation of scaling, shifting, a combination of the two, or any other mathematical operations.

The buffered media data may be made available for processing substantially immediately by using the knowledge of the time difference between the reception of the media data into the first buffer and an expected time of presentation of the media data. The media data may be made available substantially immediately for the processing, however the further flow of the media data may be delayed according to the expected time of the presentation. The expected time of presentation may be determined according to the associated time, the local time and the reference time.

Figure 2:
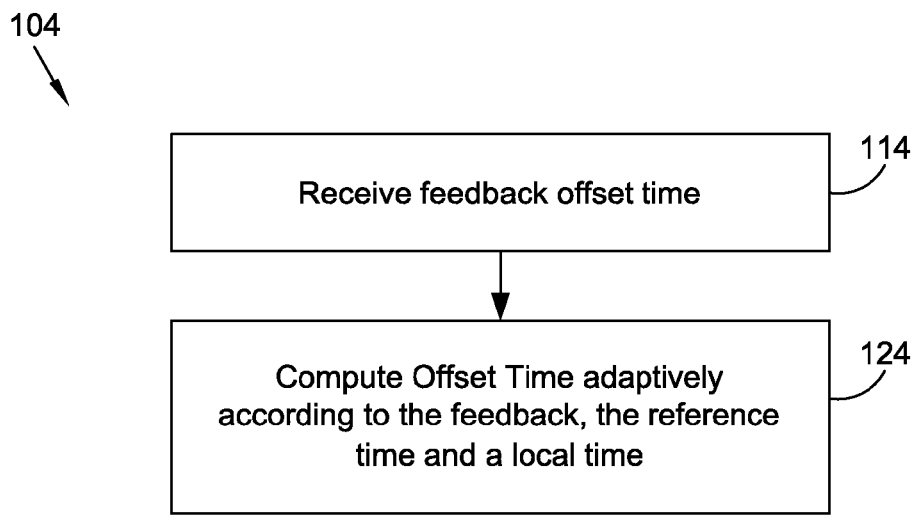
FIG. 2 shows steps of computing offset time in accordance with an embodiment of the present subject matter.

FIG. 2 shows the step 104 of computing offset time in more detail in accordance with an embodiment of the present subject matter. At step 114, a feedback offset time may be received. The feedback offset time is the offset time computed at any other earlier time. When the offset time is being computed for first time then, the feedback offset time may be nil. At step 124, the offset time may be computed adaptively according to the feedback offset time as well as the reference time and the local time. According to one embodiment, the offset time may be computed by obtaining a difference between the reference time and the local time. The offset time may also be computed according to any other function of the reference time, local time and the feedback offset time. The feedback offset time may be used to derive a threshold, and the offset time may be updated when a difference between the reference time and local time crosses the threshold. Alternately, the offset time may be computed to achieve specific adaptive bit rates of the media data. To achieve specific adaptive bit rates the offset time computation may be performed according to an average size of the media data.

Figure 3:
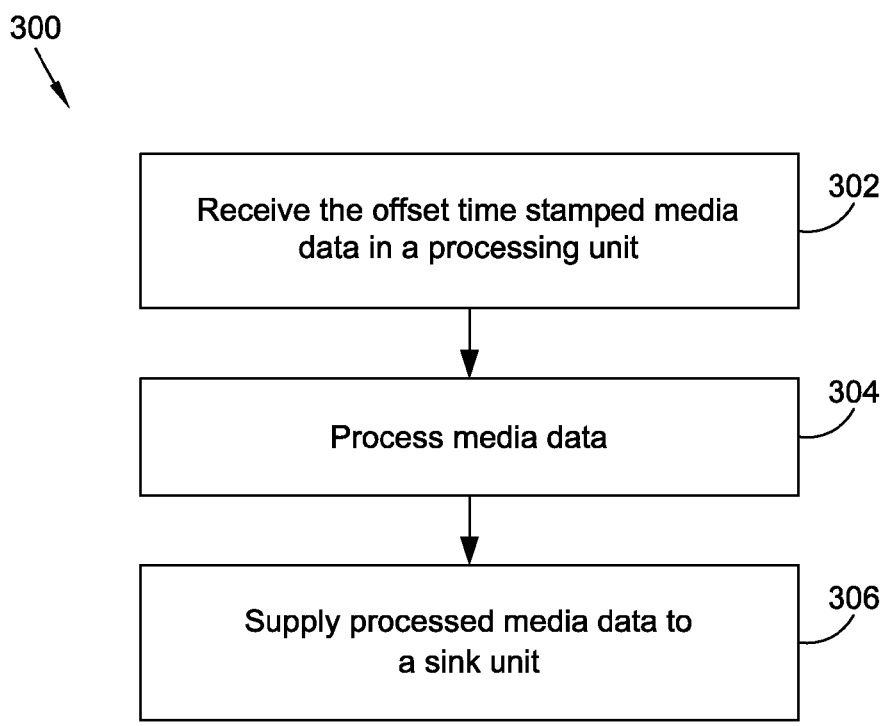
FIG. 3 shows the method of FIG. 1 in more detail in accordance with an embodiment of the present subject matter.

FIG. 3 shows a method 300 in accordance with an embodiment of the present subject matter. At step 302, which may be preceded by step 110 of FIG. 1, the media data stamped with the offset time is received in a processing unit. At step 304, the media data may be processed in the processing unit to provide a processed media data. The processed media data is in a format that is acceptable for a sink unit. At step 306, the processed media data may be supplied to the sink unit. The sink unit may be a media data presentation unit. The presentation unit may be a speaker device or a video device or any combination thereof.

Figure 4:
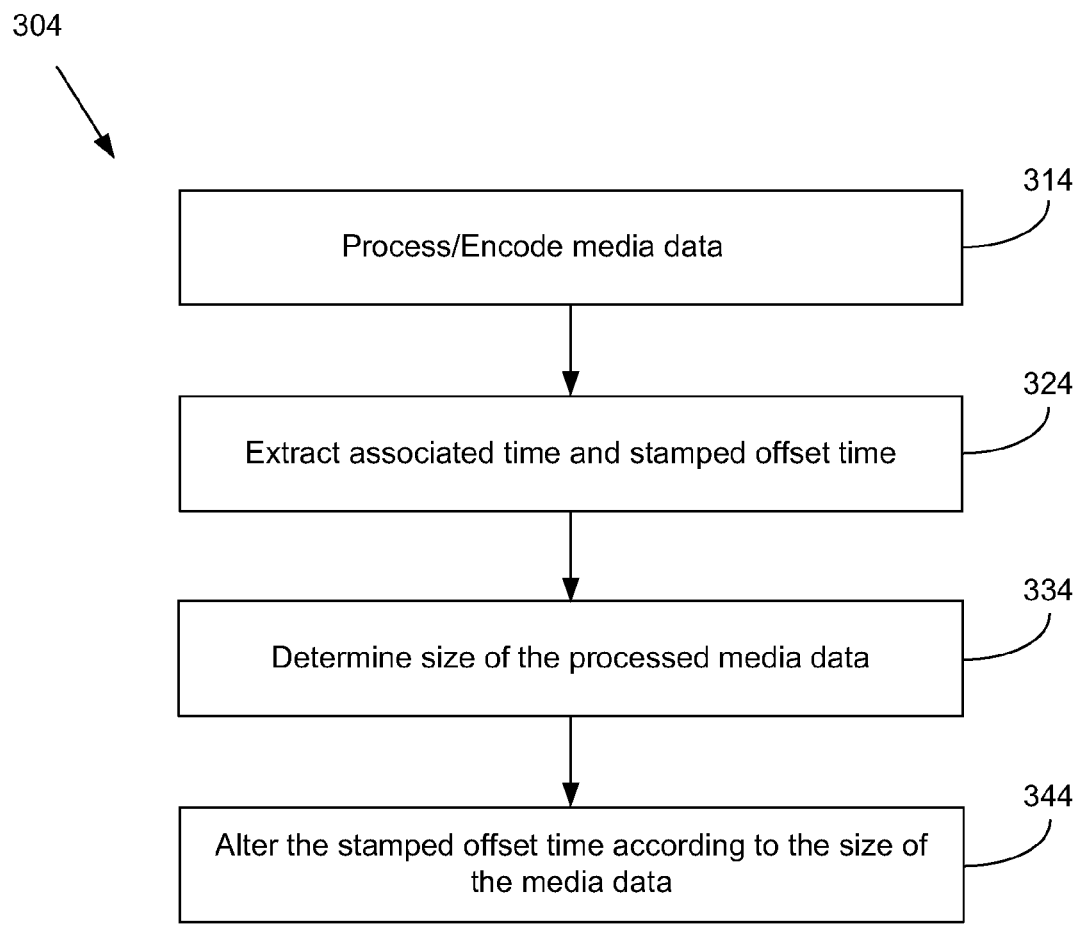
FIG. 4 shows steps of processing media data in accordance with an embodiment of the present subject matter.

FIG. 4 shows the step 304 of processing the media data in more detail in accordance with an embodiment the present subject matter. At step 314, the media data may be processed or encoded to obtain a processed media data. At this step 314, the media data may be decompressed or compressed as needed. The decompression/compression operations may be performed by rendering a code which embodies a respective decompression/compression technique. At step 324, the associated time and the stamped offset time of the media data may be extracted from the media data. Once the processed media data is obtained and the associated time and the stamped offset time are extracted, at step 334, the processing unit may determined the size of the processed media data and compare it with the size of the media data. Subject to any parameters (like size) of the processed media data as compared to desired parameters (like average bit-rate) at step 344, the processing unit may alter the stamped offset time to obtain an altered offset time. The altered offset time may be included with the processed media data. The alteration may also be performed according to other considerations such as the offset time may be tweaked in a manner so that for the media data of varying lengths/sizes is provided to the sink at a constant bit-rate.

Figure 5:
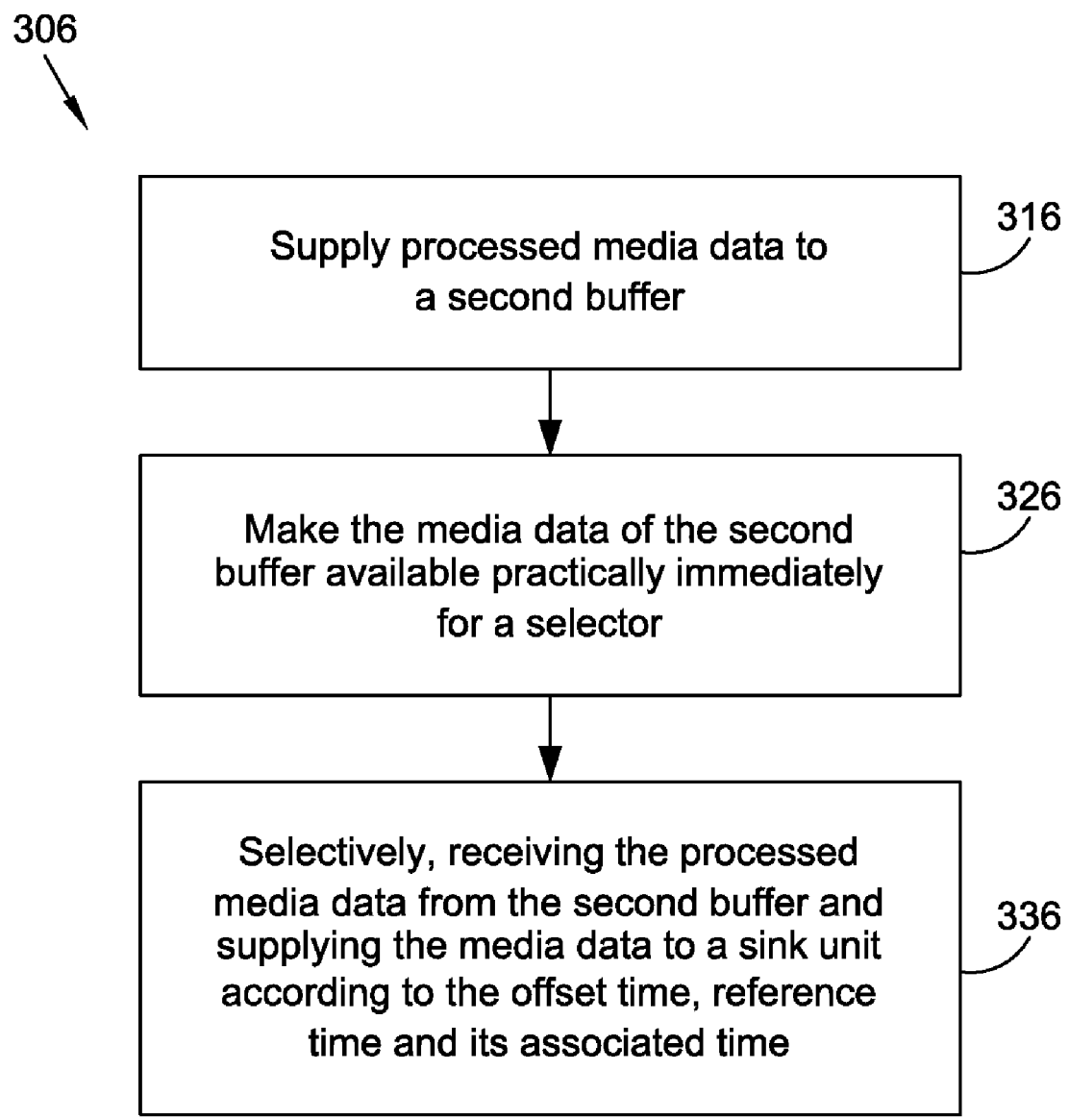
FIG. 5 shows steps of supplying processed media data to a sink unit in accordance with an embodiment of the present subject matter.

FIG. 5 shows the step 306 of supplying the processed media data to the sink unit in more detail in accordance with an embodiment of the present subject matter. At a step 316, the processed media data may be supplied to a second buffer and made available for a media data selector substantially immediately (at step 326). The processed media data may be made available for the media data selector substantially immediately by using the knowledge of the time difference between the reception of the processed media data into the media data selector and an expected time of presentation of the processed media data. Although processed media data may be made available substantially immediately for the media data selector, however the further flow of the media data may be delayed according to the expected time of the presentation. The expected time of presentation may be determined according to the altered offset time, associated time, the local time and the reference time. Making the processed media data available substantially immediately offers advantages of simplifying the media data flow and keeping it independent of the media data flow latency. It reduces the complexity of the system design and it also ensures that the media data selector is not required to wait until the second buffer is substantially filled. This also substantially eliminates the need for additional customized methods for handling cases such as network loss or network congestion. At step 336, the processed media data may be selectively received from the second buffer into the media data selector. The selective reception of the processed media data from the second buffer may include a step of checking for the altered offset time, the associated time of the processed media data and the reference time. The media data selector may hold or delay or drop the processed media data while supplying the processed media data to the sink unit. The holding or delaying or dropping of the processed media data may be performed according to the associated time, the local time and the altered offset time. The altered offset time and the local time may be used to obtain a time that may be comparable with the associated time. According to the associated time and the altered offset time, a decision may be made for delaying or dropping or holding or supplying of the processed media data. As mentioned earlier that, the associated time is the time of presentation with respect the reference time. The altered offset time is generally, a time difference between the local time and the reference time. Alternatively, the altered offset time is a time derived from a function of the reference time and the local time. The decision of delaying or dropping or holding or supplying a processed media data may be made determining a time of presentation using the associated time, the altered offset time, the reference time and the local time or using any combination thereof.

Figure 6:
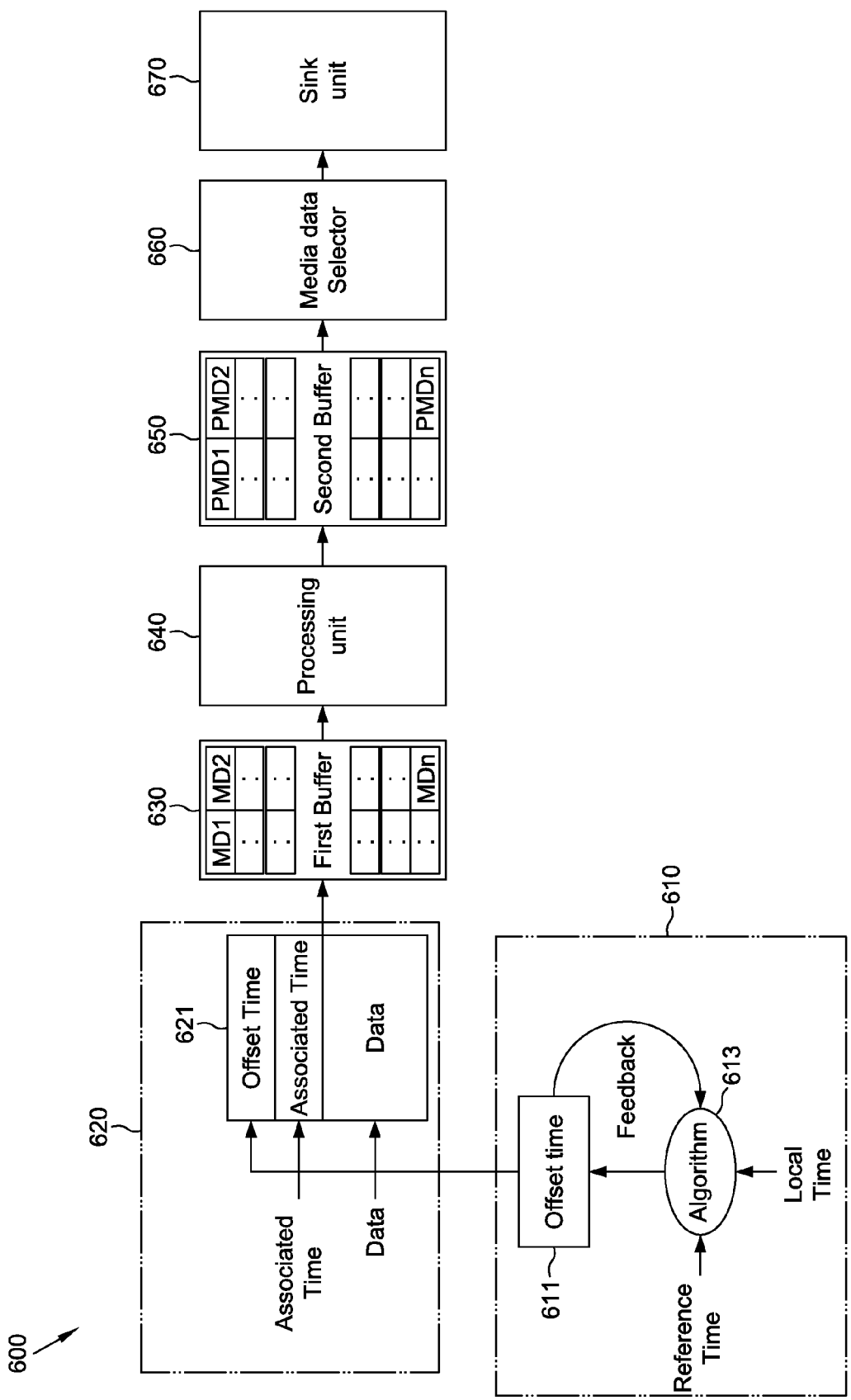
FIG. 6 shows a device in accordance with an embodiment of the present subject matter.

FIG. 6 shows a device 600 in accordance with an embodiment of the present subject matter. The device 600 comprises a computing unit 610. The computing unit 610 may be configured for receiving a reference time and a local time and for computing an offset time 611 using the reference time and the local time. The offset time 611 may be computed according to an algorithm embedded in a logic block 613. The algorithm of the logic block 613 may be implemented using a software code or implemented in a hardware or any combination thereof. The algorithm of the logic block 613 may be configured for adaptively computing the offset time 611 according to a feedback offset time. The feedback offset time may be the offset time computed at any earlier time. While computing the offset time for the first occasion the feedback offset time may be nil. The feedback offset time may be used to derive a threshold, and the offset time may be updated when the difference between the local time and the reference time crosses the threshold. Alternately, the offset time may be computed such that a desired bit rate of sinking of a media data 621 in to a sink unit is achieved. Controlling of the bit rate of sinking of the media data 621 into the sink unit using the offset time is explained earlier with reference to the FIG. 1 to 5. The device 610 may include a stamping unit 620 for receiving a media data and stamping the offset time to include the offset time with the media data. The media data 621 may have a data field, an associated time field and an offset time field as shown in the FIG. 6.

The media data 621 may be supplied to a first buffer 630. The first buffer 630 may be configured for receiving the media data 621 and making it available for processing substantially immediately. The media data 621 which has been buffered into the first buffer 630 may be made available for processing substantially immediately by using the knowledge of the time difference between the reception of the media data into the first buffer and an expected time of presentation of the media data. The expected time of presentation may be determined according to the associated time, the local time and the reference time. Although, media data 621 may be made available substantially immediately for the processing, the further flow of the media data may be delayed according to the expected time of the presentation. The first buffer 620 may be any buffer that is capable of storing the media data. The first buffer 620 may be a series of registers or memories or any other logic blocks. The first buffer 620 may be a soft buffer. The soft buffer may be implemented using a software code.

FIG. 6 depicts the first buffer 620 having media data MD1, MD2 . . . MDn stored therein. The device 600 may further include a processing unit 640 for processing the media data that may be received from the first buffer 620 to obtain a processed media data. The processing unit 630 may be arranged for supplying the processed media data to a sink unit 670. The sink unit 670 may be a presentation unit. The processing unit 640 may be arranged for altering stamped offset time. The processing unit 640 may be arranged to alter the stamped offset time by reserving a flag and/or an offset variable in the media data. While altering the offset time may be copied into this variable and/or may set the flag as well. The processing unit 640 may compute the altered offset time by determining the size of the processed media data and compare it with the size of the media data and alter the offset time to ensure that time required for communicating the processed media data remains substantially the same as the original media data received at the processing unit 640. Such altering may be advantageous for achieving a substantially constant rate of sinking of the processed media data in a sink unit 670. According to one embodiment, the stamped offset time may be altered according to an average size of the processed media data. Altering the stamped offset time allows controllability of the rate of sink of the processed media data in the sink unit.

The processing unit 640 may be arranged for supplying the processed media data to the sink unit 670 via a second buffer 650 and a media data selector 660. The processed media data from the processing unit 640 may be stored in the second buffer 650. FIG. 6 depicts the second buffer 650 having processed media data PMD1, PMD2. . . PMDn stored therein. From the second buffer the media data selector 660 may selectively obtain the processed media data according to the offset time, the reference time and its associated time. The media data selector 660 may be configured for supplying the selected data to the sink unit 670 and it may also be arranged for dropping and/or discarding the processed media data according to the offset time, the reference time and associated time. The present subject matter also teaches an article that may include a substantially the same or the same device as described above.

Figure 7:
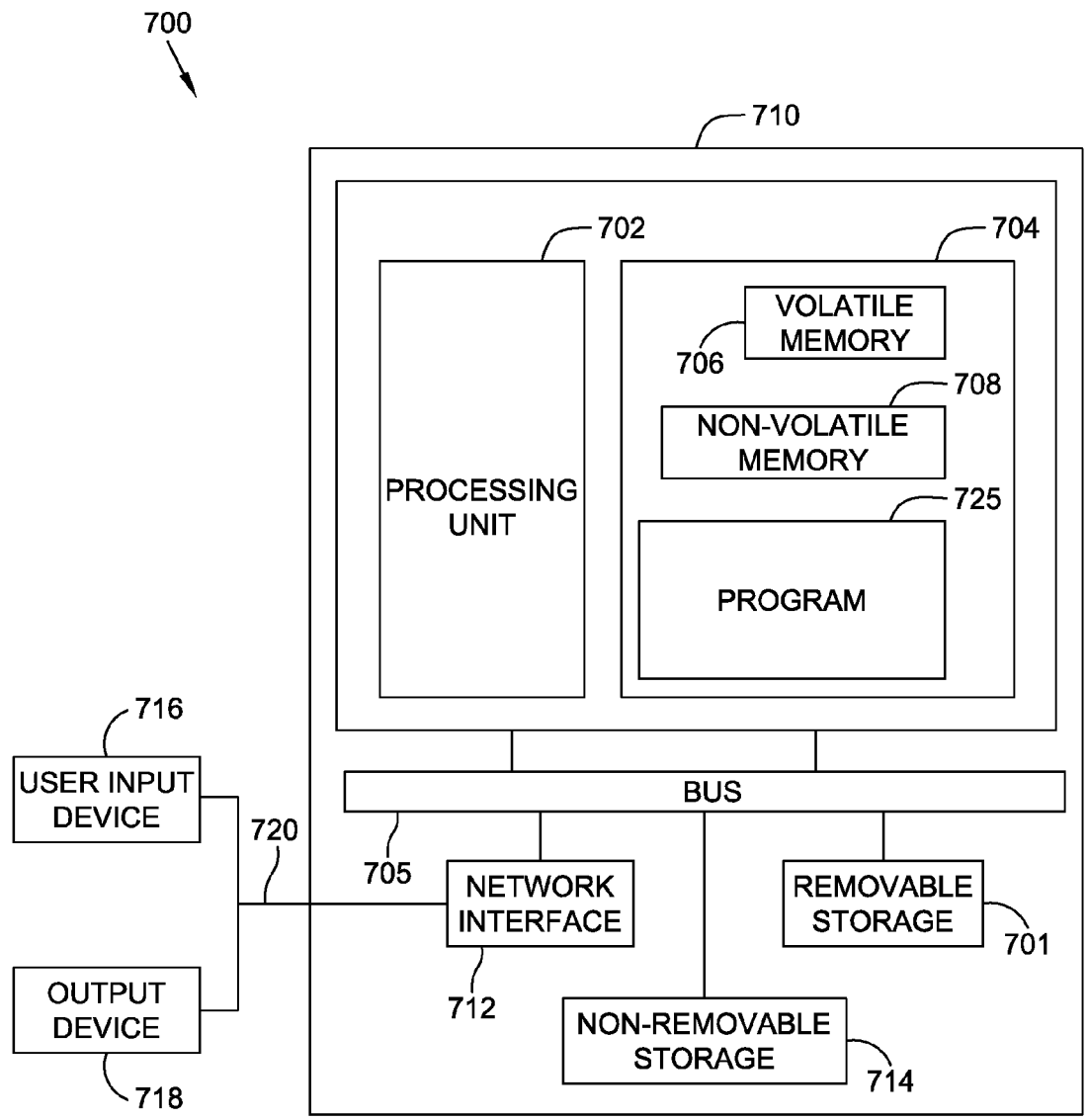
FIG. 7 shows an example of a suitable computing system environment for implementing embodiments of the present subject matter.

FIG. 7 shows an example of a suitable computing system environment 700 for implementing embodiments of the present subject matter. FIG. 7 and the following discussion are intended to provide a brief, general description of a suitable computing environment in which certain embodiments of the inventive concepts contained herein may be implemented.

A general computing device, in the form of a computer 710, may include a processor 702, memory 704, removable storage 701, and non-removable storage 714. Computer 710 additionally includes a bus 705 and a network interface 712.

Computer 710 may include or have access to a computing environment that includes one or more user input devices 716, one or more output devices 718, and one or more communication connections 720 such as a network interface card or a USB connection. The one or more output devices 718 can be a display device of computer, computer monitor, TV screen, plasma display, LCD display, display on a digitizer, display on an electronic tablet, and the like. The computer 710 may operate in a networked environment using the communication connection 720 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 704 may include volatile memory 706 and non-volatile memory 708. A variety of computer-readable media may be stored in and accessed from the memory elements of computer 710, such as volatile memory 706 and non-volatile memory 708, removable storage 701 and non-removable storage 714. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processor 702 of the computer 710. For example, a program module 725 may include machine-readable instructions capable performing step according to above discussion. In one embodiment, the program module 725 may be included on a CD-ROM and loaded from the CD-ROM to a hard drive in non-volatile memory 708. The machine-readable instructions cause the computer 710 to encode according to the various embodiments of the present subject matter. The subject matter further teaches a computer readable medium that includes instructions for performing steps according to the present subject matter. The subject matter further provides an article that includes the computer readable medium according to present subject matter.

Hence above discussion provides a method and a device for performing the method are presented. According to the method at a step a reference time is received. At a further step an offset time using the reference time and a local time is computed. At another step a media data media data is received. At a yet another step the offset time on the media data is stamped on the media data and at still another step the media data is received into a first buffer and made available for processing substantially immediately. At a subsequent step the media data may be supplied to a sink unit according to the stamped offset time, the local time and an associated time.

The above description is intended to be illustrative and not restrictive. Alternative embodiments will be apparent to those skilled in the art. The scope of the subject matter should therefore be determined by the appended claims, along with the full scope of equivalents to which such claims are entitled.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus, the following claims are hereby incorporated into the detailed description of the embodiments of the invention, with each claim standing on its own as a separate preferred embodiment.

The invention claimed is:

1. A time-offset regulated method for synchronization and rate control of media data comprising:
   receiving a reference time of a server and media data from the server by a client, wherein the media data have an associated time stamp, wherein the associated time stamp indicates an associated time for presentation of the media data with respect to the reference time;
   computing an offset time using the reference time of the server, a local time of the client, and the associated time for presentation of the media data;
   stamping the offset time on the media data for including the offset time with the media data;
   receiving the offset time stamped media data into a first buffer and making the offset time stamped media data received in the first buffer available for processing by a processing unit immediately;
   processing the offset time stamped media data to obtain a processed media data;
   computing an altered offset time by comparing the size of the processed media data with the offset time stamped media data;
   including the altered offset time with the processed media data;
   storing the processed media data having the altered offset time in a second buffer and making the stored processed media data available for a media data selector immediately; and
   supplying the stored processed media data to a sink unit according to the altered offset time, the reference time and the associated time of the media data.

2. The method as claimed in claim 1, wherein computing the offset time further comprises:
   adaptively computing the offset time according to a feedback offset time, the feedback offset time is the offset time computed at any earlier time.

3. The method as claimed in claim 1, wherein the processed media data is in a format acceptable for a the sink unit.

4. The method as claimed in claim 3, wherein the sink unit is a presentation unit.

5. The method as claimed in claim 3, wherein supplying the processed media data comprises:
   selectively supplying the processed media data to the sink unit according to the altered offset time, the reference time and the associated time of the media data.

6. The method as claimed in claim 3, wherein supplying the processed media data further comprises:
   delaying and/or holding the processed media data and/or dropping the processed media data according to the altered offset time of the processed media data.

7. The method as claimed in claim 1, wherein computing the altered offset time comprises:
   computing the altered offset time for controlling a rate of supplying the processed media data to the sink.

8. A device for synchronization and rate control of media data, comprising:
   a computing unit configured for receiving a reference time of a server and a local time of a client
   a stamping unit configured for receiving a media data from the server, wherein the media data have an associated time stamp, wherein the associated time stamp indicates an associated time for presentation of the media data with respect to the reference time, wherein the computing unit is configured for computing an offset time using the reference time, the local time, and the associated time for presentation of the media data, and wherein the stamping unit is configured for stamping the offset time on the media data to include the offset time with the media data;

a first buffer for storing the offset time stamped media data and making it available for processing by a processing unit immediately;

the processing unit for processing the offset time stamped media data to obtain a processed media data, wherein the processing unit computes an altered offset time by comparing the size of the processed media data with the offset time stamped media data, includes the altered offset time with the processed media data, and wherein the processing unit provides the processed media data having the altered offset time to a second buffer for storing and making the stored processed media data available for a media data selector immediately; and the media data selector for supplying the stored processed media data to a sink unit according to the altered offset time, the reference time and the associated time of the media data.

9. The device as claimed in claim 8, wherein the computing unit is configured for adaptively computing the offset time according to a feedback offset time, the feedback offset time is the offset time computed at any earlier time.

10. The device as claimed in claim 8, wherein the processed media data is in a format acceptable for a the sink unit.

11. The device as claimed in claim 10, wherein the sink unit is a presentation unit.

12. The device as claimed in claim 8, wherein the media data selector selectively supplies the processed media data to the sink unit according to the altered offset time, the reference time and associated time of the media data corresponding to the processed media data.

13. The device as claimed in claim 12, wherein the media data selector is configured for delaying and/or holding the processed media data and/or dropping the processed media data according to the altered offset time of the processed media data.

14. The device as claimed in claim 8, wherein the processing unit is configured for computing the altered offset time for controlling a rate of supplying the processed media data to the sink.

15. A computer system comprising:
a processor unit; and
a memory coupled to the processor, the memory having stored therein a code for performing the method of claim 1.

16. A computer-readable medium operable with a computer system, the computer-readable medium having stored thereon instructions operable with an architectural simulator environment supported by the computer system, the medium comprising: instructions for performing the method of claim 1.

17. An article comprising a computer readable medium of claim 16.

18. An article comprising the device according to claim 8.

* * * * *